(No Model.)
J. J. JOHNSTON.
DOOR SCRAPER.
No. 265,824. Patented Oct. 10, 1882.
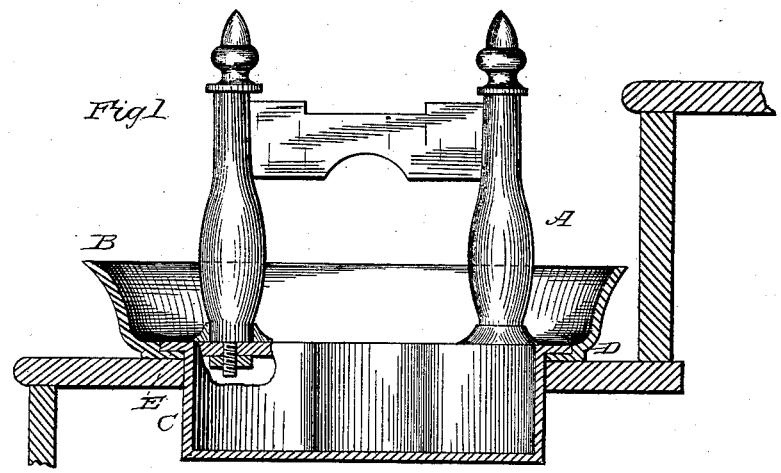
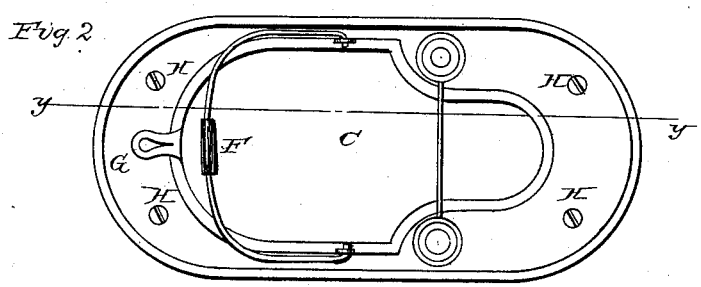
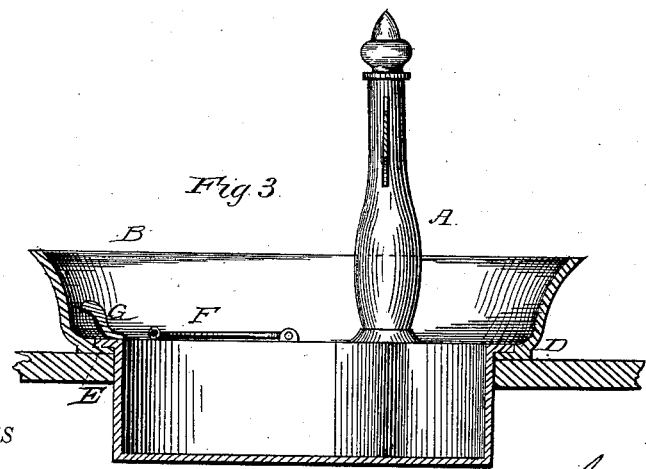
WITNESSES
Fred. G. Dieterich.
Jno. W. Glockett
INVENTOR
James J. Johnston

UNITED STATES PATENT OFFICE.

JAMES J. JOHNSTON, OF COLUMBIANA, OHIO, ASSIGNOR TO THE UNITED STATES IMPROVEMENT COMPANY, (LIMITED,) OF SAME PLACE.

DOOR-SCRAPER.

SPECIFICATION forming part of Letters Patent No. 265,824, dated October 10, 1882.

Application filed February 11, 1882. (No model.)

*To all whom it may concern:*

Be it known that I, JAMES J. JOHNSTON, of Columbiana, in the county of Columbiana and State of Ohio, have invented a certain new and useful Improvement in Door-Scrapers; and I do hereby declare that the following is a full, clear, and exact description thereof, reference being had to the accompanying drawings, and to the letters of reference marked thereon.

My invention relates to an improvement in door-scrapers; and it consists in furnishing the bowl of the foot-scraper with a detachable dirt-receiver, the whole constructed, arranged, and operating as will hereinafter more fully and at large appear.

To enable others skilled in the art with which my invention is most nearly connected to make and use the same, I will proceed to describe its construction and operation.

In the accompanying drawings, which form part of my specification, Figure 1 is a vertical section of the bowl of a foot-scraper, said bowl being provided with my improvement. Fig. 2 is a top view of the same. Fig. 3 is a vertical section at line *y* of Fig. 2.

Reference being had to the accompanying drawings, A represents an ordinary foot-scraper, and B its bowl. The bowl B is furnished with a detachable dirt-receiving vessel, C, having a flange, D, adapted to a recess, E, in the bottom of the bowl B. The vessel C is furnished with handles F and G. These several parts A, B, and C are constructed of cast-iron. The bowl B of the scraper is secured to the step by means of screws H, a space being cut out in the step for the reception of the dirt-receiving vessel C.

That class of scrapers which are always considered the most desirable by the tidy housekeeper are those having a bowl for the reception of the dirt, to prevent it from being scattered over the step or near it and liable to be tramped upon and carried into the house; but the great objection to such scraper consists in the difficulty attendant upon cleaning the dirt out of the bowl, which always requires a hand-scraper, shovel, and scuttle for the removal of the dirt from the bowl. The uprights of the scraper A being an impediment to the manipulation of the shovel, in the bowl, it becomes necessary to use a hand-scraper in combination with the shovel for the removal of the dirt.

By providing the bowl B with the detachable dirt-receiver C, having handles F and G, when the vessel becomes filled with dirt the vessel can be readily removed, emptied, and replaced in the bowl, thereby saving time and labor.

Having thus described my invention, what I claim is—

In the door-scraper hereinbefore described, the bowl B, having detachable receptacle C, provided with bail F and handle G, substantially as and for the purpose set forth.

JAMES J. JOHNSTON.

Witnesses:
A. C. JOHNSTON,
T. D. D. OURAND.